US006663982B1

(12) United States Patent
Stephens, Jr. et al.

(10) Patent No.: US 6,663,982 B1
(45) Date of Patent: Dec. 16, 2003

(54) SILVER-HAFNIUM BRAZE ALLOY

(75) Inventors: John J. Stephens, Jr., Albuquerque, NM (US); F. Michael Hosking, Albuquerque, NM (US); Frederick G. Yost, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 21 days.

(21) Appl. No.: 10/175,209

(22) Filed: Jun. 18, 2002

(51) Int. Cl.[7] .......................... B32B 15/04; B32B 15/18

(52) U.S. Cl. ........................ 428/621; 428/673; 428/335

(58) Field of Search ................................ 420/501, 422; 428/673, 621, 660, 627, 630, 631, 632, 680, 681, 684, 665, 662, 663, 657, 332, 335, 218

(56) References Cited

U.S. PATENT DOCUMENTS

| | | | | |
|---|---|---|---|---|
| 3,957,507 A | * | 5/1976 | Blumenthal et al. | 75/134 N |
| 4,485,150 A | | 11/1984 | Tsuno | 428/633 |
| 4,601,423 A | * | 7/1986 | Pipkin et al. | 228/121 |
| 4,883,218 A | | 11/1989 | Dunn et al. | 228/122 |
| 5,055,361 A | | 10/1991 | Dunn et al. | 428/633 |
| 5,695,861 A | | 12/1997 | Bloom | 428/209 |
| 6,221,511 B1 | * | 4/2001 | Sakuraba et al. | 428/621 |
| 6,367,683 B1 | | 4/2002 | Rass et al. | 228/121 |

FOREIGN PATENT DOCUMENTS

JP 02-038378 * 2/1990

OTHER PUBLICATIONS

American Society for Testing and Materials, Standard Test Method for Tension and Vacuum Testing Metallized Ceramic Seals[1], Designation:F 19–63 (Reapproved 2000), 1–4 (No date).

Stephens, et al., A Study of Active Metal Braze Alloys Based on the Ag–Hf Binary System, Abstract, from 2002 TMS Annual Meeting and Exhibition, JOM, vol. 53, No. 11, Nov. 2001, p. 13.

* cited by examiner

*Primary Examiner*—Michael La Villa
(74) *Attorney, Agent, or Firm*—Elmer A. Klavetter

(57) ABSTRACT

A binary allow braze composition has been prepared and used in a bonded article of ceramic-ceramic and ceramic-metal materials. The braze composition comprises greater than approximately 95 wt % silver, greater than approximately 2 wt % hafnium and less than approximately 4.1 wt % hafnium, and less than approximately 0.2 wt % trace elements. The binary braze alloy is used to join a ceramic material to another ceramic material or a ceramic material, such as alumina, quartz, aluminum nitride, silicon nitride, silicon carbide, and mullite, to a metal material, such as iron-based metals, cobalt-based metals, nickel-based metals, molybdenum-based metals, tungsten-based metals, niobium-based metals, and tantalum-based metals. A hermetic bonded article is obtained with a strength greater than 10,000 psi.

6 Claims, 1 Drawing Sheet

Sample
Centerline
4
2
3
4
10

SILVER-HAFNIUM BRAZE ALLOY

This invention was made with Government support under Contract No. DE-AC04-94AL85000 awarded by the Department of Energy. The Government has certain rights in the invention.

BACKGROUND OF THE INVENTION

The invention describes a silver-hafnium alloy composition, and more particularly, a silver-hafnium braze alloy composition, a bonded ceramic-metal and ceramic-ceramic article and a method of making said article.

Brazing is uniquely suited to the fabrication of ceramic-to-ceramic and ceramic-to-metal joints and seals due to the introduction of a liquid phase at the interface that facilitates reactions, diffusion and stable chemical bonds. Structural ceramics are among the most stable compounds known. A result of the chemical stability of ceramics is that they are difficult for liquid metals to wet. Because wetting is necessary for producing useable braze joints, an essential consideration in ceramic brazing is the need to promote wetting of the ceramic surfaces by the braze filler metals.

The conventional practice of brazing ceramics to ceramics or to metals involves a two step metallizing method in which a thin layer of metal is bonded to the ceramic component to improve the wettability of the ceramic surfaces by conventional low temperature filler metals. The metals are usually deposited by electroplating; however, in certain cases the coatings are produced by reducing oxides or sintered metal powder techniques.

The most widely known ceramic brazing method is the "moly-manganese" (Mo—Mn) method in which paint comprised of Mo and Mn powder is applied to the ceramic, generally $Al_2O_3$ or BeO, and fired in a controlled hydrogen atmosphere to create a strongly adherent viscous melt composed of metals and residual oxides not completely reduced by sintering. This surface is usually plated with a 2 to 4 micrometers thick layer of Ni or Cu, providing a surface that can be wetted easily by filler materials. Tsuno (U.S. Pat. No. 4,485,150, issued on Nov. 27, 1984) describes such a method for bonding a metal body and a ceramic body by adhering a metallizing layer to a ceramic body surface by heating under wet hydrogen atmosphere, nickel plating the surface and brazing by means of a silver-copper brazing alloy.

A more direct approach to ceramic/metal joining involves the use of active metal braze alloys. These alloys have the potential to eliminate numerous process steps involved, such as the need for Mo—Mn metallization and subsequent Ni plating of alumina ceramics prior to brazing. Most commercial active metal braze alloys use Ti as an active element, with the most widely used composition being 63 wt % Ag—35.25Cu—1.75Ti. For many applications, Ti is an excellent active element and it reacts adequately with many non-metallic materials. However, there are certain metallic alloys, used extensively for electronic applications, where the Ti is scavenged by the dissolution of Fe, Ni, and Co into the braze joint, resulting in diminished amounts of Ti for reaction with the ceramic side of the joint. This can result in non-hermetic joints, or relatively low production yields.

Useful would be a metal braze alloy with an active element that allows use in a wider range of ceramic substrates.

DESCRIPTION OF SPECIFIC EMBODIMENTS

Figure 1:
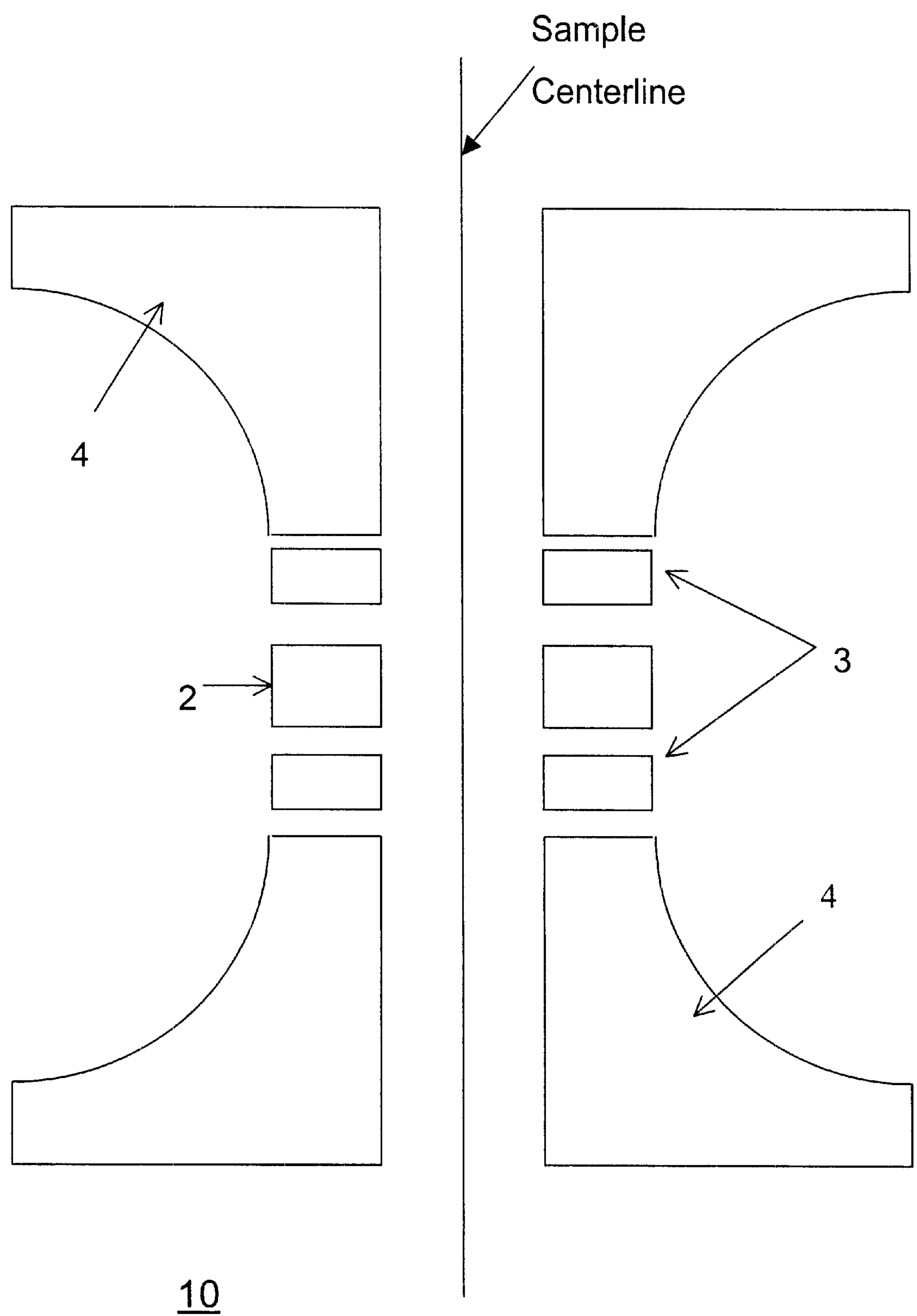
FIG. 1 shows a schematic of the tensile button sample geometry used to evaluate the alloy composition of the present invention.

Hermetic brazing to a ceramic surface with a conventional (that is, not containing an active metal) braze alloy has previously been achieved by metallizing the ceramic surface using the moly-manganese (Mo—Mn) method along with nickel plating of the surface. A ceramic is a nonmetallic mineral substance. In the method of the present invention, sapphire, being an oxide of aluminum, is considered to be a ceramic surface. In general, most alumina ceramic materials used commercially have a glassy grain boundary phase; for example, 94% alumina ceramic has 6% glassy phases. Other ceramic materials besides alumina include, but are not limited to, silicon nitride and silicon carbide.

The present convention comprises a composition of an essentially binary alloy system of silver and hafnium wherein the silver composition comprises approximately greater than 95 wt % and less than approximately 98 wt %, the hafnium composition comprises greater than approximately 2 wt % up to a maximum of approximately 4.1 wt. %, with trace amounts (less than approximately 0.2 wt %) of other metals.

An alloy using zirconium as the active element was first considered because thermodynamic evidence from its phase diagram showed that $ZrO_2$ had higher thermal stability relative to alumina at elevated temperatures. One such composition that was investigated was essentially an alloy of eutectic Ag—Cu combined with 2 wt. % Zirconium as the active element. The particular alloy in question had a composition of 69.2 wt. % Ag—28.7Cu—2.1Zr. While the eutectic 72Ag—28Cu braze alloy has a eutectic temperature of 780° C., it was expected that this alloy could produce hermetic braze joints as temperatures of 840–850° C. However, this proved not to be the case, and a series of non-hermetic samples were brazed prior to discovering that a braze process temperature of 950° C., with either a 5 or 10 minute hold at this temperature, was required to produce hermetic samples. That process used for this alloy included a partial pressure of high purity Argon of 12 Torr at 950° C. The microstructural reason for the high braze process temperature is apparent by means of examining the Ag—Cu—Zr ternary phase diagram. Based on the equilibrium phase diagram, it is apparent that all of the Zr in this alloy is tied up as a ternary $Cu_4Ag_1Zr_1$ intermetallic compound, with a very high apparently melting point (1079° C.) relative to the eutectic 72Ag—28Cu alloy.

A problem with having a liquid range of 780–950° C. during braze processing is that the braze alloy has extensive opportunity to wet on the metallic side of the braze joint, and it tends to run down extended metallic flanges. It therefore may not have a chance to wet the ceramic by the time temperatures of approximately 950° C. are reached. As such, while this alloy might seem to be an attractive alloy, its utility as an alloy for metal/ceramic brazing is quite marginal.

Based on the relative thermodynamic stability of $HfO_2$, which is considerably more stable than either $ZrO_2$ or alumina at all temperatures, the Ag—Hf binary alloy system was examined. While the equilibrium phase diagram for Ag—Hf is not available, it is appropriate to use the Ag—Zr system as an analog system to gain an idea of alloy microstructure near the Ag—rich end. In the Ag—Zr system, the eutectic composition between Ag and AgZr occurs at 2.5 at. % Zr (where at. % is the atomic weight percent), which equals 2.1 wt. % Zr. If the Ag—Hf to Ag—Zr system analogy holds, then one would expect a eutectic composition near 2.5 at. % Hf (Ag—4.07wt. % Hf), between Ag and AgHf phases. Based on this analysis and the three Ag—Hf alloys that were fabricated in button form (see Table 1 below), it was deduced that the 93.2Ag—6.8wt. % Hf alloy would have too high a density of AgHf intermetallic second phase to permit easy conversion into thin strip form. In order to fabricate useful braze alloys, it is necessary to be able to convert as-cast and annealed ingots of the braze alloy into thin strip (that is, between approximately 0.002 and 0.003 inches thickness). This is easily achieved with a primary phase that is ductile, and, if a brittle second phase is present, that second phase should be confined to a low volume fraction.

TABLE 1

| Alloy Number | Wt. % Ag | Wt. % Hf | At. % Ag | At. % Hf |
|---|---|---|---|---|
| 1 | 97.5 | 2.5 | 98.5 | 1.5 |
| 2 | 96.6 | 3.4 | 97.9 | 2.1 |
| 3 | 93.2 | 6.8 | 95.8 | 4.2 |

Button ingots with Ag—Hf alloy compositions shown in Table 1 were arc melted prepared. Based on the expected problem with higher volume fractions of the AgHf intermetallic compound, only alloy numbers 1 and 2 as shown in Table 1 were rolled into strips of 0.002 and 0.003 inches thick. The alloy compositions were analyzed using ion-coupled plasma/atomic emission spectroscopy; a summary of typical results are shown in Table 2, with weight percentages shown at the 95% confidence level. (Sample numbers 1a and 1b were obtained from opposite sides of the arc melted button ingot).

TABLE 2

| Alloy Sample No. | Silver wt % | Hafnium wt % | Trace elements wt % |
|---|---|---|---|
| 1a | 97.8 | 2.3 | 0.1 |
| 1b | 97.6 | 2.3 | <0.01 |
| 2a | 96.4 | 3.2 | 0.1 |
| 2b | 96.7 | 3.3 | <0.01 |
| 3a | 92.7 | 6.1 | <0.2 |
| 3b | 91.9 | 6.4 | <0.2 |

The average oxygen content for the samples ranged from approximately 80 ppm to approximately 200 ppm for the samples with less than approximately 4 wt % hafnium and up to almost 400 ppm for the samples with greater than 6 wt % hafnium.

Brazing experiments were performed using the alloy compositions. Ceramcic tensile button samples 10 (see FIG. 1 for an illustration) conforming to the ASTM F19-64 (American Society for Testing and Materials (ASTM) F19–64, Annual Book of ASTM Standards, 1996, Vol. 10.04, West Conshohocken, Pa., 25–28; incorporated by reference herein) were prepared, containing 0.010 inch thick 54Fe—29Ni—17Co alloy interlayers 2, each braze sample using two 0.003 inch thick Ag—Hf foil preforms 3 placed above and below the 54Fe—29Ni—17Co alloy interlayer 2. The alumina tensile buttons 4 conforming to the sketch shown in ASTM F19-64 were made from WESGO AL-500 ceramic, a 94% alumina ceramic composition that is generally available. The tensile button sample pairs were brazed in a dry hydrogen braze furnace, with an approximate dewpoint of −60° C. The results of the ASTM F19 tensile pull tests, showing the maximum strength for tree separate tests for each sample, are shown in Table 3, along with the braze process temperature and time at temperature. All of the samples were leak checked and all samples were found to be hermetic (with a resolution of approximately $10^{-9}$ $cm^3$/sec leak rate). Hermetic means that the test specimen does not leak at a particular leak sensitivity resolution where that resolution value is specified by ASTM F19-64. ASTMF19-64 specifies that a brazed test specimen be vacuum-leak checked on any standard leak checker, subjecting the specimen to an atmosphere of helium for 0.5–5 minutes where the specimen shows no indication of a leak at a sensitivity of $5\times10^{-9}$ cm/s or better.

TABLE 3

| Braze Alloy Number (Composition) | Braze Process Temp./Time | Maximum Strengths (psi) | Average Strength ± Std. Dev. (psi) |
|---|---|---|---|
| 1 (97.5Ag—2.5Hf) | 990° C./10 min | 11,680; 15,110; 15,370 | 14,050 ± 2,060 |
| 1 (97.5Ag—2.5Hf) | 995° C./10 min | 13,880; 13,990; 16,490 | 14,780 ± 1,480 |
| 2 (96.6Ag—3.4Hf) | 990° C./10 min | 16,250; 17,870; 19,540 | 17,880 ± 1,650 |
| 2 (96.6Ag—3.4Hf) | 995° C./10 min | 15,600; 15,720; 17,690 | 16,340 ± 1,170 |

It is important to note that 11 of the 12 samples reported in Table 3 had fractures which were in the bulk ceramic, far removed from the braze joint. The bulk ceramic fractures indicate that the braze/ceramic interface, and reaction layer which contains $HfO_2$, is significantly stronger in tension than the tensile strength of the ceramic material.

"The braze process temperature used in these experiments were 990° C. and 995° C. The braze temperature should be above 980° C. for the braze joint to properly form a hermetic seal, and should generally not exceed 1000° C. for best results with respect to braze alloy runout on metallic flanges. The brazing occurred in dry hydrogen for these experiments but can also occur in an inert gas, such as argon, or in a vacuum. Dry hydrogen is generally used to mitigate other problems."

The braze compositions of the present invention were also formed as 0.002 and 0.003 inch thick strips. This geometry is useful in practical braze processes. The strips are juxtaposed between the ceramic and metal material to be joined (or alternatively, between two ceramic materials). Metals to be bonded to ceramic materials include, but are not limited to, iron-based metals, cobalt-based metals, nickel-based metals, molybdenum-based metals, tungsten-based metals, niobium-based metals, and tantalum-based metals. Useful ceramic materials include, but are not limited to, alumina, quartz, aluminum nitride, silicon nitride, and mullite. The materials are heated, generally in a furnace, to a temperature greater than approximately 980° C. for generally at least approximately 5 to approximately 30 minutes, forming a hermetic brazed joint with good strength characteristics. The temperature can be ramped or heated slowly to mitigate fracturing of the ceramic surface. Both ceramic-metal and ceramic-ceramic bonded articles can thus be prepared using the braze alloy of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A bonded article comprising a first material, selected from a first ceramic material and a metal material, bonded to a second ceramic material by a layer of brazing material, said brazing material having a composition comprising greater than approximately 95 wt % silver, greater than approximately 2 wt % hafnium, less than approximately 4.1wt % hafnium, and less than approximately 0.2 wt % trace elements, said metal selected from the group consisting of iron-based metals, cobalt-based metals, nickel-based metals, molybdenum-based metals, tungsten-based metals, niobium-based metals, and tantalum-based metals.

2. The bonded article of claim 1 wherein said first ceramic material is selected from the group consisting of alumina, quartz, aluminum nitride, silicon nitride, silicon carbide, and mullite.

3. The bonded article of claim 1 wherein said layer of brazing material has a thickness before brazing between approximately 0.002 inches and approximately 0.003 inches.

4. The bonded article of claim 1 wherein said bonded article is hermetic, herein hermetic is determined according to ASTM standard F19–64.

5. The bonded article of claim 1 wherein said bonded article has a strength greater than approximately 10,000 psi, said strength determined according to ASTM standard F19-64.

6. The bonded article of claim 1 wherein said second ceramic material is selected from the group consisting of alumina, quartz, aluminum nitride, silicon nitride, silicon carbide, and mullite.

* * * * *